Jan. 22, 1935.  W. G. G. GODRON  1,988,727
SEALING SYSTEM FOR RECIPROCATING MEMBERS
Filed Nov. 18, 1933
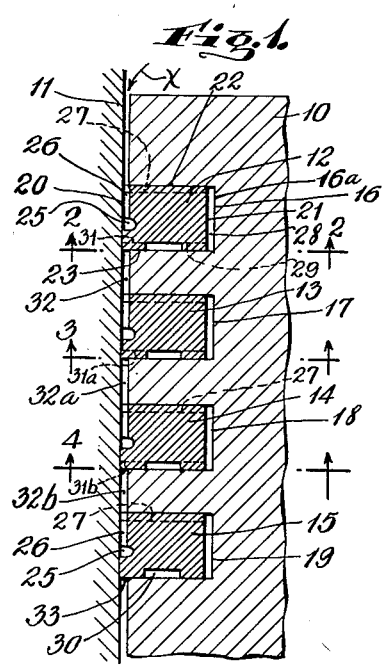
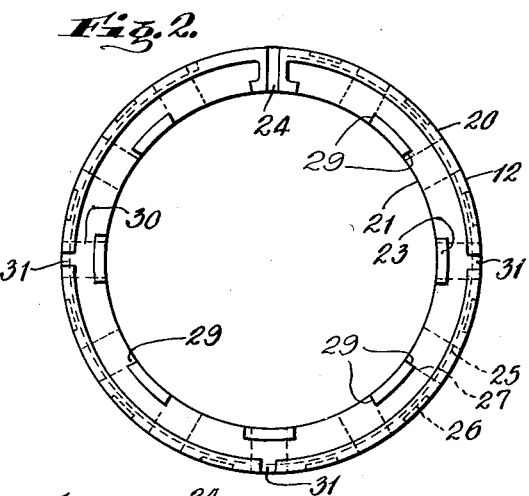
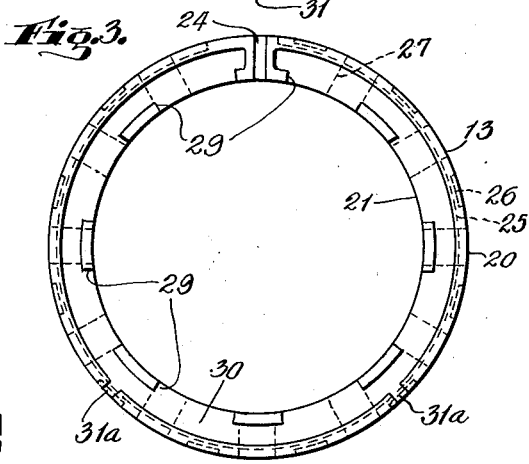
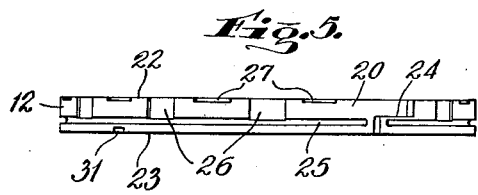
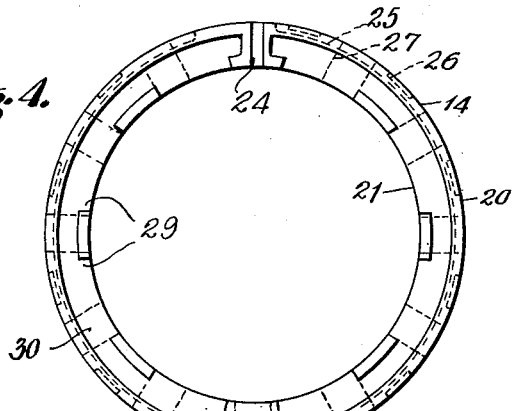
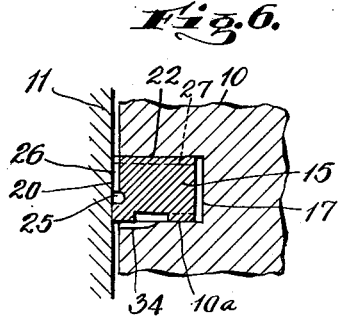
INVENTOR
WILLIAM G. G. GODRON
BY
*Howard E. Thompson*
ATTORNEY Patented Jan. 22, 1935

1,988,727

UNITED STATES PATENT OFFICE 1,988,727

SEALING SYSTEM FOR RECIPROCATING MEMBERS

William G. G. Godron, New York, N. Y.

Application November 18, 1933, Serial No. 698,605

12 Claims. (Cl. 309—31)

This invention relates to the sealing of reciprocating members in the cylinder or other body in which such members are mounted, and particularly in the use of a plurality of sealing devices or rings so constructed and arranged with respect to each other as to provide an efficient system of sealing; and the object of the invention is to provide a series of devices or rings which are so constructed in relationship with respect to each other on the reciprocating member as to more evenly distribute the blow-by pressure over the series of rings employed so as to minimize the friction of the rings in their ring grooves, and further to eliminate excessive wear of the entire ring system, and especially the first rings directly exposed to the prevailing pressure; a further object being to provide a sealing system involving a plurality of rings spaced longitudinally of a reciprocating member wherein the rings successively exposed to the prevailing blow-by pressure are provided with graduated blow-by passages from one ring to a next adjacent ring and yet effecting a substantial seal of the reciprocating member in the body in which the same is operated by the complete ring system; a further object being to provide the rings or sealing devices of a system of the class under consideration with means for exposing both side surfaces and back surface of each ring to the prevailing pressure to provide a substantially balanced mounting of the rings in the ring grooves, and still further to expose the outer surfaces of the rings to the prevailing pressure to provide a substantially full floating ring mounting; and with these and other objects in view, the invention consists in a sealing system of the class and for the purpose specified which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a sectional view through a part of the wall structure of a reciprocating member illustrating a series of rings therein.

Fig. 2 is a bottom plan view of one of the rings shown in Fig. 1, looking in the direction of the arrow 2—2 of said figure.

Figs. 3 and 4 are views similar to Fig. 2 but looking in the direction of the arrows 3—3 and 4—4 of Fig. 1.

Fig. 5 is an edge view of the rings shown in Fig. 2; and,

Fig. 6 is a view similar to Fig. 1 but showing only a part of the construction and showing a modification.

To illustrate one use of my invention, I have indicated at 10 in Fig. 1 of the drawing, a part of the wall structure of a reciprocating member, such for example, as a piston movable in a cylinder, one wall of which is indicated at 11. In practice, I provide the piston 10 with a sealing system including a plurality of longitudinally spaced rings 12, 13, 14 and 15 disposed in ring grooves 16, 17, 18 and 19 respectively.

Each of the rings 12 to 15 inclusive is of identical construction except as to certain features and like references will indicate like parts or features in the respective rings. Therefore, the brief description of one will apply to all, the ring 12 being shown in Figs. 1, 2 and 5.

For the purposes of description, the surfaces of the respective rings will be identified as a front surface 20, back surface 21, top or outer surface 22 and bottom or inner surface 23, it being understood that the surfaces 22 and 23 constitute the side surfaces of the ring and the reference thereto as top and bottom surfaces will apply to vertically reciprocating parts, whereas outer and inner will apply to the exposure of the surfaces with respect to prevailing pressures, the outer surface being the surface first exposed to the pressure.

In the construction shown, the rings are preferably of the split type as indicated at 24, note Figs. 2 and 5, and the front surface 20 is provided with a circumferential groove 25 terminating short of the split 24 and a plurality of transverse grooves or passages 26 place the circumferential groove 25 in communication with the prevailing pressure by exposure through the top or outer surface 22.

Intermediate the grooves or passages 26, the top or outer surface 22 is provided with radial grooves 27 spaced circumferentially and which open through the front surface 20 and back surface 21, it being understood at this time that the back surface 21 is disposed in spaced relation to the inner wall 16a of the groove to form an annular chamber 28 whereby the prevailing pressure entering as indicated by the arrow $x$, Fig. 1, may pass through the radial grooves 27 into the chamber 28 and from there through a plurality of circumferentially spaced radial passages or grooves 29, note Fig. 2, into a circumferential groove 30 on the lower or inner side surface of the ring, said groove being disposed inwardly of the front surface 20 and having its ends terminating short of the split 24.

As previously stated, this construction of the rings is common in all of the rings 12, 13, 14 and 15, the only difference between these rings being that the ring 12 has three grooves or ports 31 spaced circumferentially thereof which place the groove 30 in communication with the front surface 20 of the ring, or in other words, with the clearance space 32 between the piston 10 and cylinder 11 as well as between the rings 12 and 13, whereas the ring 13 has two grooves or passages 31a for a similar purpose, except that the latter open into the clearance space 32a between the rings 13 and 14. The ring 14 has one groove or passage 31b opening into the space 32b between the rings 14 and 15, and the ring 15 does not include any of the grooves or passages 31, 31a, 31b, thus effecting a substantial seal by the annular surface 33, note Fig. 1, disposed outwardly of the groove 30.

Instead of constructing the series of rings in the manner above referred to, all of the rings employed in the piston may be of identical construction or in other words, similar to the rings 15, and the blow-by passages 31, 31a and 31b instead of being formed in the ring itself may be provided in one wall of the ring grooves as is indicated in Fig. 6 of the drawing, in which 10 represents a part of the piston, 11 the cylinder, 15 a ring identical with the ring 15, Fig. 1, it being understood that all of the rings will be of the same construction, whereas the ring grooves 16, 17 and 18 will have one side wall 10a thereof provided with grooves or passages 34 of an arrangement and relative area in the respective grooves 16, 17 and 18 similar to the arrangement and area of the grooves 31, 31a and 31b in the rings 12, 13 and 14.

The purpose of the grooves 31, 31a and 31b as well as the grooves 34 is to provide in a multiple ring system, a means for permitting escape of prevailing pressure to more evenly balance or distribute the pressure throughout a ring series in effecting a seal and to eliminate excessive pressures on the first ring exposed to the pressure. For example, let us assume that in normal practice and with conventional ring designs, the prevailing pressure entering at the arrow $x$, Fig. 1, upon the top or outer surface 22 of the ring 12 is seven hundred pounds per square inch. This pressure would drop in passing the ring 12 and entering the clearance chamber 32 to about three hundred pounds per square inch, and in like manner to the chamber 32a to one hundred and fifty or one hundred and seventy-five pounds per square inch, and so forth.

Whereas, with the present construction, the pressure drop to the clearance chamber 32 would be from seven hundred pounds to five hundred or five hundred and fifty pounds or thereabouts, and from there to the chamber 32a to about three hundred pounds, it being understood at this time that the area of the grooves or passages 31, 31a, 31b, or the equivalent passages 34 in the piston may be varied in different ring systems to increase or decrease the relative pressure drop as between the rings in the series, depending upon the use of the sealing system and also, to some degree, on the number of rings employed. This arrangement of ring system may be made to produce a substantial seal in the last ring employed, subject to any blow-by that might prevail by the split part of the ring when split rings are used.

Having fully described my invention, what I claim as new and desire to secure by Letters Patent, is:

1. In a reciprocating member having an end adapted to be subjected to pressure, said member having a plurality of longitudinally spaced ring grooves extending from a point adjacent said end inwardly on said member, a sealing system for said member including annular sealing devices disposed in said grooves, each device comprising front, back and side surfaces, and the side surfaces exposed to the pressure end of said member constituting outer side surfaces and the opposed surfaces the inner side surfaces, the inner side surface of said devices being provided with a circumferentially arranged groove disposed substantially inwardly of the front surface of said devices, said inner surface also having circumferentially spaced passages extending from the groove inwardly and opening through the back surface of said devices, and means including blowby passages extending across said inner surface from said circumferential grooves outwardly through the front surfaces of said devices and diminishing progressively the blowby on the inner side surfaces of successive sealing devices on said member for distributing the pressure through the series of devices employed.

2. In a reciprocating member having an end adapted to be subjected to pressure, said member having a plurality of longitudinally spaced ring grooves extending from a point adjacent said end inwardly on said member, a sealing system for said member including annular sealing devices disposed in said grooves, each device comprising front, back and side surfaces, and the side surfaces exposed to the pressure end of said member constituting outer side surfaces and the opposed surfaces the inner side surfaces, the inner side surface of said devices being provided with a circumferentially arranged groove disposed substantially inwardly of the front surface of said devices, said inner surface also having circumferentially spaced passages extending from the groove inwardly and opening through the back surface of said devices, means including blowby passages extending from said circumferential grooves outwardly through the front surfaces of said devices and diminishing progressively the blowby on the inner side surfaces of successive sealing devices on said member for distributing the pressure throughout the series of devices employed, and means for exposing the front surface of the respective devices to the prevailing pressure at the outer side surface thereof.

3. In a reciprocating member having an end adapted to be subjected to pressure, said member having a plurality of longitudinally spaced ring grooves extending from a point adjacent said end inwardly on said member, a sealing system for said member including annular sealing devices disposed in said grooves, each device comprising front, back and side surfaces, and the side surfaces exposed to the pressure end of said member constituting outer side surfaces and the opposed surfaces the inner side surfaces, the inner side surface of said devices being provided with a circumferentially arranged groove disposed substantially inwardly of the front surface of said devices, said inner surface also having circumferentially spaced passages extending from the groove inwardly and opening through the back surface of said devices, means including blowby passages extending from said circumferential grooves outwardly through the front surfaces of said devices and diminishing progressively the blowby on the inner side surfaces of successive sealing devices on said member for distributing the pressure through the series of devices employed, and the outer side surface of the devices having radial passages spaced circumferentially thereof and opening through the front and back surfaces.

4. A sealing system for reciprocating members of the class described comprising a plurality of rings arranged in ring grooves spaced longitudinally of said member, each of said rings consisting of front, back and side surfaces, one side surface having radial passages opening through the front and back surfaces thereof, the opposed side surface of the ring having a circumferential groove means providing communication between said circumferential groove and said back surface, and means including blow-by passages extending from said circumferential groove through the front surface of the rings and diminishing progressively the blow-by from ring to ring of the system whereby a prevailing pressure is reduced from ring to ring to proportionately distribute the pressure throughout the ring system.

5. A sealing system for reciprocating members of the class described comprising a plurality of rings arranged in ring grooves spaced longitudinally of said member, each of said rings consisting of front, back and side surfaces, one side surface having radial passages opening through the front and back surfaces thereof, the opposed side surface of the ring having a circumferential groove, means providing communication between said circumferential groove and said back surface, means including blow-by passages extending from said circumferential groove through the front surface of the rings and diminishing progressively the blow-by from ring to ring of the system whereby a prevailing pressure is reduced from ring to ring to proportionately distribute the pressure throughout the ring system, the passages and grooves on the side surfaces of the ring serving to substantially balance the rings as between the walls of the ring grooves, and the front surface of each of said rings having a circumferential groove exposed to the prevailing pressure at one side surface of the rings to relieve the pressure of the rings upon an adjacent wall to be engaged thereby.

6. A sealing ring of the class described having front, back and side surfaces, one side surface of said ring being provided with a circumferentially arranged groove disposed substantially inwardly of the front surface of the ring, said side surface also having circumferentially spaced passages extending from the groove inwardly and opening through the back surface of the ring, and said side surface having a blow-by passage extending from said groove across said side surface and opening outwardly through the front surface of said ring.

7. A sealing ring of the class described having front, back and side surfaces, one side surface of said ring being provided with a circumferentially arranged groove disposed substantially inwardly of the front surface of the ring, said side surface also having circumferentially spaced passages extending from the groove inwardly and opening through the back surface of the ring, said side surface having a blow-by passage extending from said groove and opening outwardly through the front surface of said ring, and the opposed side surface of the ring having circumferentially spaced radial passages opening through the front and back surfaces of the ring.

8. A sealing ring of the class described having front, back and side surfaces, one side surface of said ring being provided with a circumferentially arranged groove disposed substantially inwardly of the front surface of the ring, said side surface also having circumferentially spaced passages extending from the groove inwardly and opening through the back surface of the ring, said side surface having a blow-by passage extending from said groove and opening outwardly through the front surface of said ring, the opposed side surface of the ring having circumferentially spaced radial passages opening through the front and back surfaces of the ring, and the front surface of the ring having a circumferentially extending groove and circumferentially spaced passages extending from the groove outwardly through the last named side surface of the ring.

9. A sealing means for reciprocating members involving a series of annular sealing devices arranged longitudinally of said member, each device having front, back, outer and inner side surfaces, the inner side surface of said devices having an annular sealing surface adjacent the front surface thereof, means comprising grooves and recesses on opposed side surfaces of each device whereby a prevailing pressure at the outer side surface of each device will extend to the back and inner surface thereof up to said annular sealing surface, and means involving blowby passages on the annular sealing surfaces diminishing progressively the blow-by on successive sealing devices for distributing a prevailing pressure throughout the series of devices employed without a material drop in pressure as between successive devices.

10. A sealing means for reciprocating members involving a series of annular sealing devices arranged longitudinally of said member, each device having front, back, outer and inner side surfaces, the inner side surface of said devices having an annular sealing surface adjacent the front surface thereof, means comprising grooves and recesses on opposed side surfaces of each device whereby a prevailing pressure at the outer side surface of each device will extend to the back and inner surfaces thereof up to said annular sealing surface, means involving blow-by passages on the annular sealing surfaces diminishing progressively the blow-by on successive sealing devices for distributing a prevailing pressure throughout the series of devices employed without a material drop in pressure as between successive devices, and the front surfaces of said devices having annular grooves, means providing communication between said annular grooves and said outer side surfaces whereby the pressure prevailing at such outer surfaces may extend to the front surfaces of said devices.

11. A piston ring for use on a piston provided with a ring receiving groove, said ring comprising front, back, upper and lower side surfaces, said upper surface being adapted to be exposed to a pressure which normally urges said lower side surface into contact with an adjacent surface of said groove, said lower side surface being provided with an annular groove disposed substantially inwardly of said front surface, said lower side surface also having a plurality of radial grooves extending inwardly from said annular groove to said back surface, said annular groove and said radial grooves being exposed to said pressure, whereby excessive friction between said lower side surface and said adjacent surface is eliminated by partially balancing the pressure on said upper side surface, and the lower side surface having a blow-by passage extending from said annular groove outwardly across the lower surface to the front surface of the ring.

12. A sealing system for reciprocating members of the class described comprising a plurality of rings arranged in successive ring grooves spaced longitudinally of a reciprocating member, each of said rings consisting of front, back and side surfaces, one side surface of each ring being exposed to the prevailing pressure, the opposite side surface of the ring having blowby passages opening through the front surface of the ring, means providing communication between the first side surface of the ring and said blowby passages whereby the prevailing pressure at the first side surface of the ring extends to said blowby passages and said blowby passages progressively diminishing in area, whereby the blowby from ring to ring of the system is progressively diminished and whereby a prevailing pressure is reduced from ring to ring to proportionately distribute the pressure throughout the ring system.

WILLIAM G. G. GODRON.